US011440104B2

(12) United States Patent
Moser

(10) Patent No.: US 11,440,104 B2
(45) Date of Patent: Sep. 13, 2022

(54) DEVICE FOR CLAMPING A WORKPIECE

(71) Applicant: MOST Technik GmbH, St. Konrad (AT)

(72) Inventor: Friedrich Moser, Scharnstein (AT)

(*) Notice: Subject to any disclaimer, the term of this patent is extended or adjusted under 35 U.S.C. 154(b) by 30 days.

(21) Appl. No.: 16/640,733

(22) PCT Filed: Aug. 23, 2018

(86) PCT No.: PCT/AT2018/050018
§ 371 (c)(1),
(2) Date: Feb. 21, 2020

(87) PCT Pub. No.: WO2019/036734
PCT Pub. Date: Feb. 28, 2019

(65) Prior Publication Data
US 2020/0180042 A1    Jun. 11, 2020

(30) Foreign Application Priority Data
Aug. 25, 2017  (AT) .............................. A50712/2017

(51) Int. Cl.
*B23B 31/16*    (2006.01)
*B23B 31/28*    (2006.01)
*B23B 31/40*    (2006.01)

(52) U.S. Cl.
CPC ........ *B23B 31/16045* (2013.01); *B23B 31/28* (2013.01); *B23B 31/406* (2013.01); *B23B 31/16* (2013.01); *B23B 2260/062* (2013.01)

(58) Field of Classification Search
CPC . B23B 31/16045; B23B 31/28; B23B 31/406; B23B 2260/062; B23B 2260/07;
(Continued)

(56) References Cited

U.S. PATENT DOCUMENTS 1,699,359 A * 1/1929 Hay .................... B23B 31/28
                                                      279/134
1,713,797 A    5/1929 Whiton
(Continued)

FOREIGN PATENT DOCUMENTS

DE    1281783 B * 10/1968 ....... B23B 31/16079
DE    2816163     10/1979
(Continued)

OTHER PUBLICATIONS

Espacenet Abstract for DE 1020 10018342 A1, Jan. 5, 2012.
Espacenet Abstract for DE 1020 10033859 A1, Feb. 16, 2012.
Espacenet Abstract for EP 0554685 B1, Jul. 26, 1995.

*Primary Examiner* — Eric A. Gates
*Assistant Examiner* — Paul M Janeski
(74) *Attorney, Agent, or Firm* — Tiajoloff & Kelly LLP

(57) ABSTRACT

A device for clamping a workpiece has a receiving head in a housing connected to a rotary drive with a rigid drive connection between a drive motor and the receiving head, radially adjustable clamping jaws connected to a clamping drive externally clamping the workpiece, and linear drives displacing the clamping jaws and forming the clamping drive driven jointly by a gear transmission with a central gear coaxial to the drive shaft of the receiving head by a separate drive motor. The central gear can be driven synchronously with the receiving head in the clamping position of the clamping jaws, and the rotary drive for the central gear comprises a rigid drive connection between its drive motor and the central gear or a superimposed gear comprising two input shafts drive-connected to the drive motor for the rotary drive of the receiving head and to the drive motor for the central gear.

8 Claims, 3 Drawing Sheets

Figure 1:
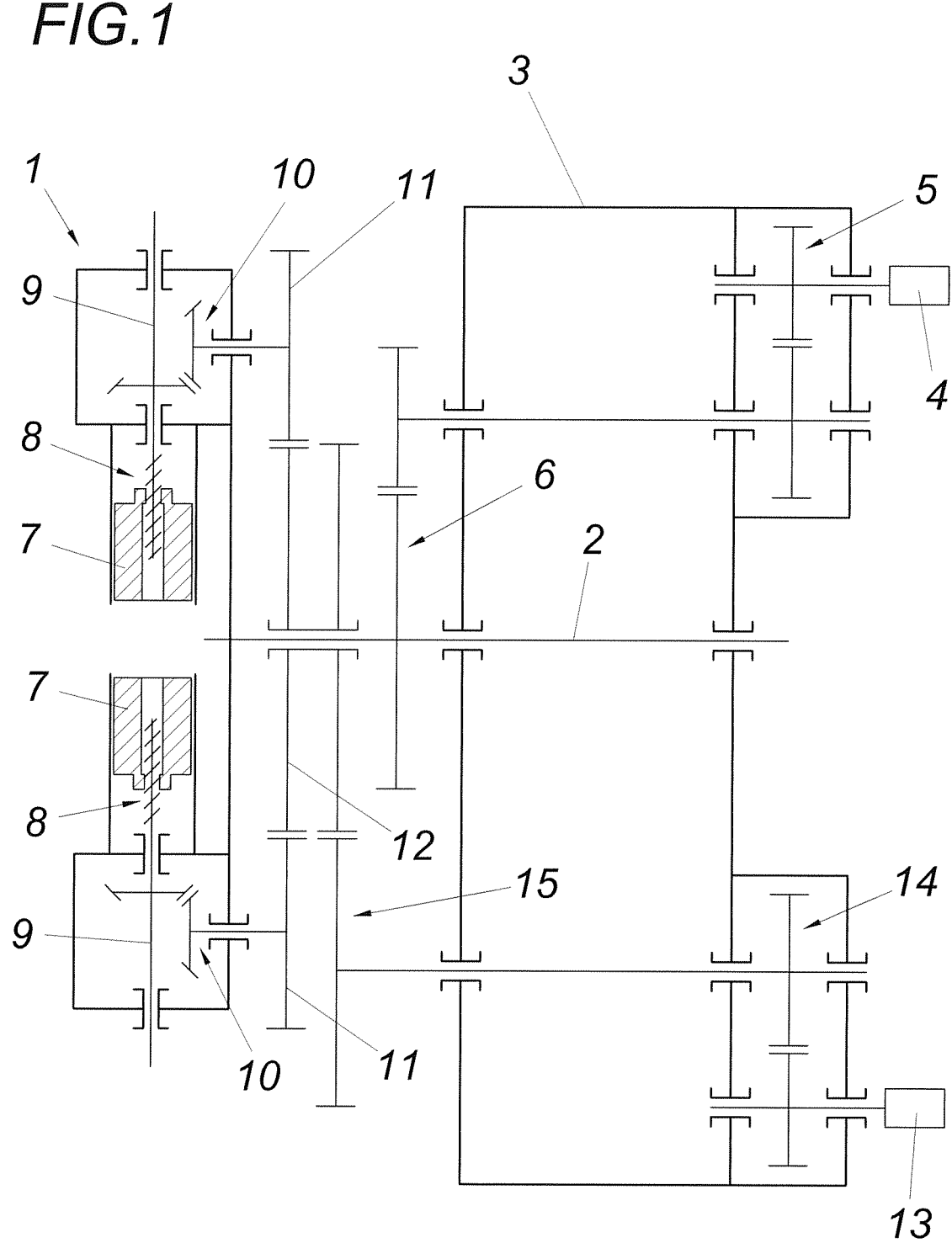

(58) Field of Classification Search
CPC ... B23B 31/16; B23B 31/12; B23B 31/16083;
Y10T 279/29
USPC ........................................................ 279/137
See application file for complete search history.

(56) References Cited

U.S. PATENT DOCUMENTS

| | | |
|---|---|---|
| 2,867,441 A | 1/1959 | Skillin |
| 2,883,201 A | 4/1959 | Goodrum |
| 4,482,163 A | 11/1984 | Depweg |
| 4,951,535 A | 8/1990 | Hiestand |
| 5,464,233 A | 11/1995 | Hanai |
| 9,346,105 B2 * | 5/2016 | Mikoleizig ............. B23B 31/26 |
| 9,555,479 B2 * | 1/2017 | Tiefenbock ............. B23B 31/26 |

FOREIGN PATENT DOCUMENTS

| | | | | |
|---|---|---|---|---|
| DE | 102010018342 A1 * | 1/2012 | ....... | B23B 31/16004 |
| DE | 102010018342 A1 | 1/2012 | | |
| DE | 102010033859 A1 | 2/2012 | | |
| EP | 0288786 A1 * | 11/1988 | ....... | B23B 31/16045 |
| EP | 0314945 A2 | 5/1989 | | |
| EP | 0554685 B1 | 1/1993 | | |
| FR | 528448 A * | 11/1921 | ....... | B23B 31/16045 |
| GB | 1131092 | 10/1968 | | |
| GB | 2018638 A | 10/1979 | | |
| GB | 2498061 A | 7/2013 | | |

\* cited by examiner

DEVICE FOR CLAMPING A WORKPIECE

FIELD OF THE INVENTION

The invention relates to a device for clamping a workpiece having a receiving head which is rotatably mounted in a housing and is connected to a rotary drive with a rigid drive connection between a drive motor and the receiving head, having clamping jaws radially adjustable in the receiving head and connected to a clamping drive for externally clamping the workpiece, and having linear drives displacing the clamping jaws and forming the clamping drive, which can be jointly driven by a gear transmission with a central gear coaxial to the drive shaft of the receiving head by a separate drive motor.

DESCRIPTION OF THE PRIOR ART

For straightening workpieces with a pronounced longitudinal axis, such as rods, bars, profiles and tubes, the workpiece clamped at the ends in receiving heads can be bent out and bent back again with the aid of the receiving heads in directions that change at least in predetermined angular ranges by not only rotating the receiving heads clamping the two ends of the workpiece about their longitudinal axis, but also pivoting them about a pivot axis perpendicular thereto. The clamping of workpieces at the ends in the receiving heads, however, makes high demands with regard to the absorption of the large load forces that occur and the clamping width of the clamping jaws, which are intended to securely clamp workpieces with a comparatively wide range of diameters. Normal chucks are therefore unsuitable for such an application.

In order to be able to adjust the span width of the clamping jaws in a wide range in chucks with clamping jaws of a rotary drivable receiving head actuated by a clamping drive, it is known (U.S. Pat. No. 4,482,163 A) to provide screw drives for the radial adjustment of the clamping jaws, which are actuated via a central crown gear which can be driven by the hollow drive shaft of the receiving head and meshes with the bevel gears associated with the screw drives. The screw drives move the clamping jaws in frames, which are guided radially displaceable in the receiving head and are loaded by means of deflection levers through a hydraulically operated push rod. This clamping drive thus acts on the frames in which the clamping jaws are radially displaced by the screw drives to set the required span width. For the clamping process, the clamping jaws must therefore be held in the frame so that they cannot move, which is achieved by connecting the crown gear provided for the common drive of the screw drives to the receiving head in a rotationally fixed manner by means of a locking device. Apart from the fact that separate frames for holding the clamping jaws, which are radially displaceable in the receiving head and connected to the clamping drive, and the radial displacement of the clamping jaws in the frame with the aid of screw drives result in a considerable design effort, the restrictions on the clamping forces caused by the clamping drive through deflection levers in particular must be accepted.

In addition, clamping devices with a receiving head which can be driven by a drive motor are known (EP 0 554 685 A1, DE 28 16 163 A1), which receiving head has radially displaceable clamping jaws which can be driven jointly via one spindle drive each, wherein the rotary drive for the spindle drives comprises a central gear which can be driven by a separate drive motor. The rotary drive for the central gear is equipped with a clutch, with the help of which the drive connection between the drive motor and the central gear can be interrupted, so that the central gear can co-rotate with the receiving head without drive when the receiving head is driven and thus maintain the set clamping position of the clamping jaws, but with the disadvantage that the clamping position of the clamping jaws can no longer be determined after the central gear has been decoupled from its drive. It is therefore neither possible to check nor to change the clamping force while driving the receiving head.

SUMMARY OF THE INVENTION

The invention is thus based on the object of designing a device for clamping workpieces in such a way that the requirements with regard to the checking and modification of the clamping forces, which occur in particular in the case of receiving heads with a wide clamping range and high clamping forces, can be advantageously met.

Based on a clamping device of the type described above, the invention solves the object set in that the central gear is drivable in the clamping position of the clamping jaws in synchronism with the receiving head, wherein the rotary drive for the central gear comprises either a rigid drive connection between its drive motor and the central gear or a superimposed gear which comprises, in addition to the output shaft for driving the central gear, two input shafts which are drive-connected on the one hand to the drive motor for the rotary drive of the receiving head and on the other hand to the drive motor for the central gear.

In order to be able to use the advantage of the clamping drives designed as linear drives in an advantageous way, especially with regard to the larger span width range and the application of clamping force, an actuation of the linear drives by rotating the receiving head around its drive shaft must be excluded. This is achieved in a simple way by driving the central gear in the clamping position of the clamping jaws synchronously with the receiving head. The synchronous drive of the central gear, in comparison to a mere locking of the central gear in relation to the receiving head, has the advantage that, with an appropriate loading of the central gear, the clamping forces between the clamping jaws and the workpiece can be predetermined depending on the respective requirements.

There are two possibilities for driving the central gear, wherein a separate drive motor must be provided for each central gear drive. The central gear may in fact be connected to this drive motor by a rigid drive connection or may be driven by a superimposed gear which, in addition to the output shaft for driving the central gear, has two input shafts which are drive-connected, on the one hand, to the drive motor for driving the receiving head in rotation and, on the other hand, to the drive motor for driving the central gear. If there is a rigid drive connection between the central gear and its drive motor, the drive motor must be controlled in such a way that the central gear rotates synchronously with the receiving head when the clamped workpiece is to be rotated by the receiving head. The angle of rotation between the receiving head and the central gear thus determines the radial actuating path of the clamping jaws, by taking into account the given transmission ratios.

If the central gear is driven by means of a superimposed gear, the transmission ratios can be selected in such a way that when the drive motor for the central gear stops, the central gear is driven synchronously with the receiving head. This means that the angle of rotation of the drive motor for the central gear predetermines the radial displacement of the clamping jaws, which creates particularly simple setting conditions.

In order to be able to apply high clamping forces, it is recommended that the linear drives designed as spindle drives are each driven by a gear whose drive shaft carries a gearwheel meshing with the central gear so that, on the one hand, favourable design conditions are also created for a receiving head with a large span width for the then large radial distance of the gears from the axis of rotation of the receiving head and, on the other hand, advantageous transmission ratios can be ensured for the drive of the individual spindle drives. Worm or angular gears are preferably used as gears for the spindle drive.

Although the central gear only has to be mounted coaxially to the axis of rotation of the receiving head, particularly simple design conditions are achieved when the central gear is mounted freely rotatable on the drive shaft of the receiving head, because in this case a larger amount of space can be used for the drive of the linear drives.

Due to the high clamping forces required for some applications, there is a risk that the hollow workpieces will be pressed in by the clamping jaws in the case of hollow workpieces, especially thin-walled pipes. To counter this danger, the receiving head can have additional expanding jaws to clamp the hollow workpieces inside, so that the expanding jaws form a counter support for the clamping jaws. An expanding mandrel can be provided to actuate the expanding jaws, which is mounted in the drive shaft of the receiving head so that it can be adjusted axially, for example.

BRIEF DESCRIPTION OF THE INVENTION

Figure 2:
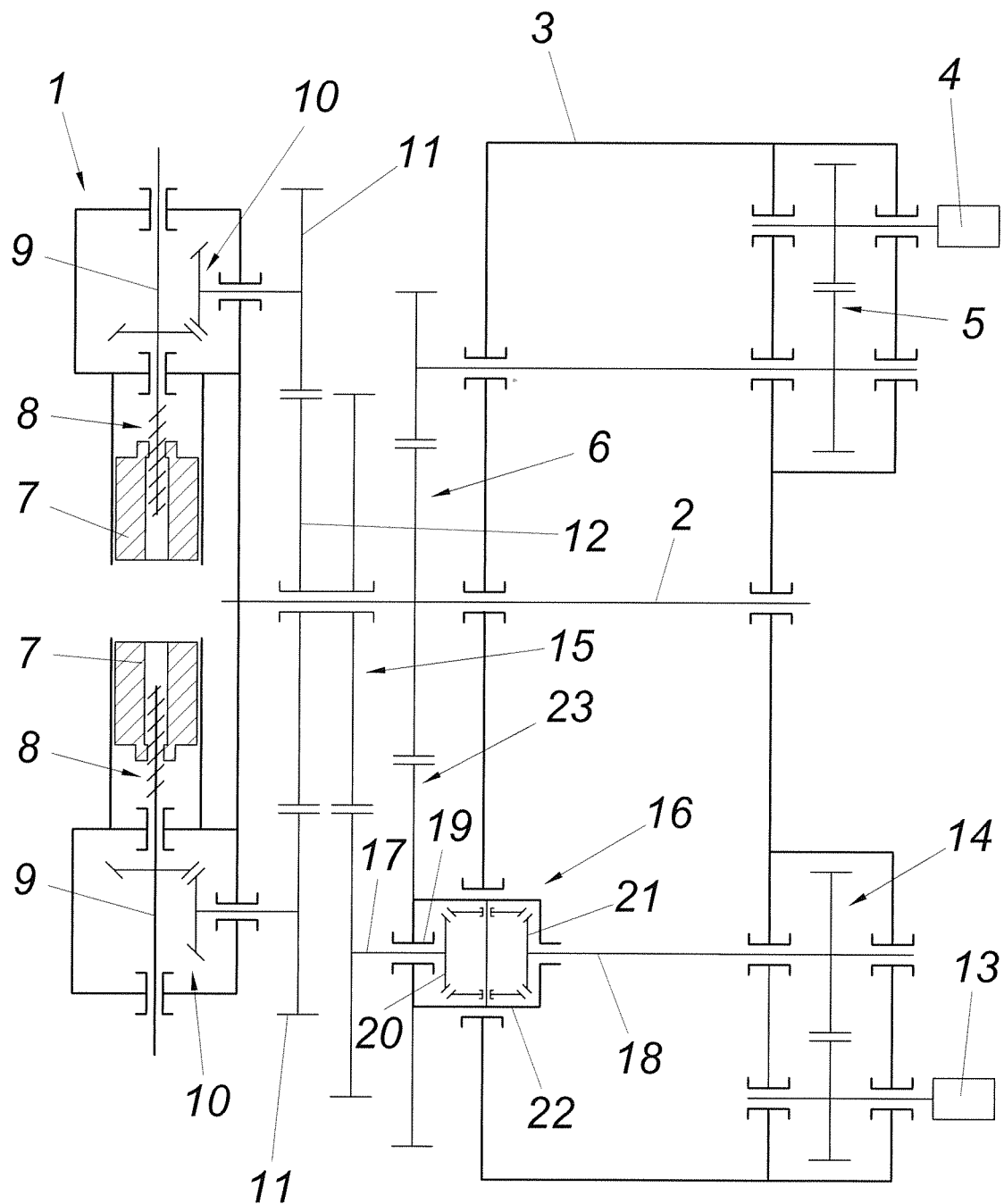
Figure 3:
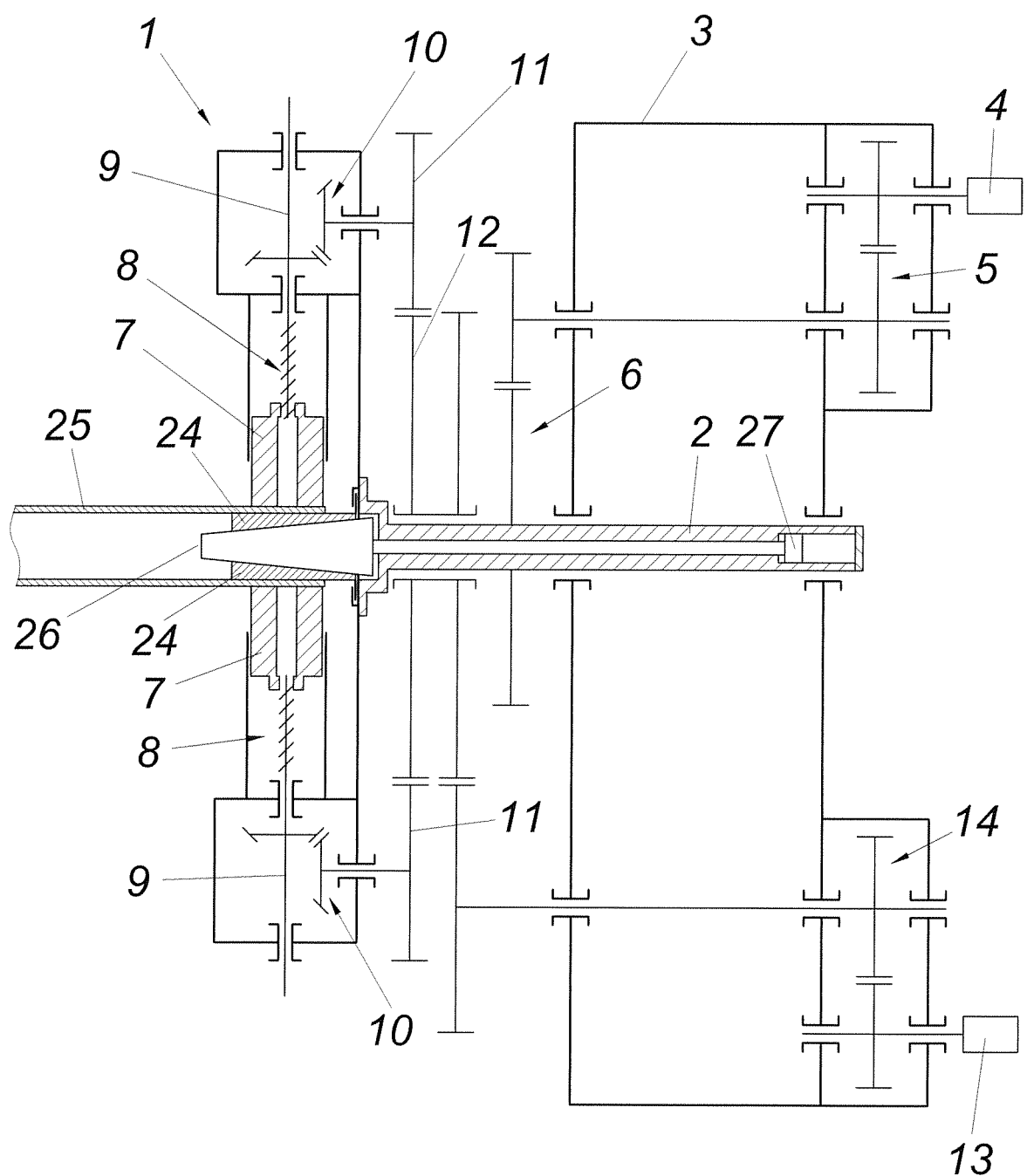

In the drawing, for example, the subject matter of the invention is shown by way of example, wherein:

FIG. 1 shows a device according to the invention for clamping a workpiece in a schematic block diagram, FIG. 2 shows a representation, corresponding to FIG. 1, of a design variant of a clamping device according to the invention, and FIG. 3 shows a further embodiment of a clamping device according to the invention, also in a schematic block diagram.

DESCRIPTION OF THE PREFERRED EMBODIMENTS

A clamping device according to the invention has a receiving head 1 whose drive shaft 2 is rotatably mounted in a housing 3 and is driven by a drive motor 4 via a two-stage gearwheel transmission with gear stages 5 and 6. Radially displaceable clamping jaws 7 are provided in the receiving head 1, which can be displaced radially by means of a linear drive 8 designed as a spindle drive. For this purpose, the spindles 9 can be driven via an angular gear 10, whose drive shaft carries a gearwheel 11 which meshes with a central gear 12 common to all linear drives 8. This central gear 12 is mounted on the drive shaft 2 of the receiving head 1 so that it can rotate freely and is driven by a drive motor 13 via a two-stage gearwheel transmission with gear stages 14 and 15. Accordingly, if the drive motor 13 for the linear drives 8 is switched on while the drive motor 4 for the receiving head 1 is stationary, the clamping jaws 7 are adjusted accordingly by the common central gear 12 so that a workpiece can be clamped between the clamping jaws 7. If the drive motor 4 for the receiving head 1 is then actuated, the drive motor 13 must be controlled as a function of the speed of the drive motor 4 so that the central gear 12 is driven synchronously with the receiving head 1, because a relative rotation between receiving head 1 and central gear 12 causes a displacement of the clamping jaws 7. However, the drive motor 13 for the central gear 12 can be controlled to increase the clamping force. The support of the clamping jaws 7 on the workpiece prevents a relative rotation between the receiving head 1 and the central gear 12. The drive motors 4 and 13 for the receiving head 1 and the central gear 12 are controlled by means of a corresponding control device, which is not shown for reasons of clarity.

The embodiment according to FIG. 2 differs from FIG. 1 essentially only in the rotary drive for the central gear 12, i.e. between the two gear stages 14 and 15 of the drive connection between central gear 12 and drive motor 13 there is a superimposed gear 16 whose output shaft 17 drives gear stage 15 and whose two input shafts 18 and 19 are driven on the one hand by gear stage 14 and on the other hand by drive shaft 2 of the receiving head 1. The transmission ratios are selected so that when the drive motor 13 is at a standstill, the central gear 12 is driven at the speed of the receiving head 1. In the embodiment example shown, the output shaft 17 is formed by a gear element 20, while the opposite gear element 21 is driven by the input shaft 18. The web 22, which forms the input shaft 19, is in drive connection with the drive shaft 2 of the receiving head 1 via a gear stage 23. However, such a design of the superimposed gear 16 is by no means mandatory.

As shown in FIG. 3, in addition to the clamping jaws 7 for external clamping of a workpiece, the receiving head 1 can be equipped with expanding jaws 24 for internal clamping of a hollow workpiece 25, for example a pipe. These radially displaceable expanding jaws 24, which are guided in the receiving head 1, can be actuated by means of an expanding mandrel 26 in the manner of a wedge gear and form a counter-holder to the clamping jaws 7 which grip the workpiece 25 from the outside, so that the hollow workpiece 25 cannot be pressed in by the clamping jaws 7. The expanding jaws 24 are advantageously mounted in a floating manner to ensure independent centering relative to the clamping jaws 7.

The expanding mandrel 26 can be guided for its operation within the hollow drive shaft 2 and connected to a piston 27, which is hydraulically loaded to expand the expanding jaws 24. For the adjustment of the expanding mandrel 26, however, a different actuator can also be used.

The invention claimed is:

1. A device for clamping a workpiece, said device comprising:
    a receiving head having a drive shaft rotatably mounted in a housing and connected to a rotary drive with a rigid drive connection between a drive motor and the receiving head;
    the receiving head having
    clamping jaws radially adjustable in the receiving head and connected to a clamping drive causing external clamping of the workpiece; and
    linear drives that displace the clamping jaws and form the clamping drive and that are driven jointly by a gearwheel transmission with a central gear coaxial to a drive shaft of the receiving head by a separate drive motor;
    wherein the central gear is driven synchronously with the receiving head in the clamping position of the clamping jaws;
    wherein the central gear has a rotary drive that comprises either a rigid drive connection between the separate drive motor and the central gear or a superimposed gear that comprises an output shaft driving the central gear and two input shafts that are drive-connected to the drive motor for the rotary drive of the receiving head and to the separate drive motor for the central gear;

wherein the linear drives are spindle drives each driven by a gear with a drive shaft that carries a gearwheel meshing with the central gear; and wherein the central gear is rotatably mounted on, and radially outward of, the drive shaft of the receiving head.

2. A device according to claim 1, wherein the receiving head has additional expanding jaws internally clamping a hollow workpiece.

3. A device according to claim 2, wherein the expanding jaws are actuated by an expanding mandrel mounted in an axially adjustable manner in the drive shaft of the receiving head.

4. A device for clamping a workpiece, said device comprising:
- a housing supporting a receiving head for rotary movement with respect thereto;
- the receiving head having a drive shaft connected with a rigid drive connection between a receiving-head drive motor and the receiving head such that the receiving-head drive motor causes rotation of the receiving head;
- the receiving head having clamping jaws supported for radially adjustable movement in the receiving head, and linear drives connected with the clamping jaws so as to move the clamping jaws radially and provide external clamping of the workpiece;
- a central gear rotatably mounted coaxially on, and radially outward of, the drive shaft of the receiving head, the central gear being driven synchronously with the receiving head when the clamping jaws clamp the workpiece;

wherein the central gear has a rotary drive that comprises either a rigid drive connection between the central gear and a central-gear drive motor or a superimposed gear that has an output shaft driving the central gear and two input shafts, one of the input shafts being connected with the receiving-head drive motor for the rotary drive so as to be driven thereby and the other of the input shafts being connected with the central-gear drive motor so as to be driven thereby;

wherein the linear drives are each driven by a gear with a drive shaft that carries a respective gearwheel meshing with the central gear, said gearwheels each being positioned radially outward of the central gear and meshing with a radially outwardly disposed gear portion thereof.

5. The device according to claim 4, wherein the receiving head has additional expanding jaws configured to internally clamp the workpiece when the workpiece is a hollow workpiece.

6. The device according to claim 5, wherein the expanding jaws are actuated by an expanding mandrel supported in the drive shaft of the receiving head for axially adjustable movement therein.

7. A device according to claim 4, wherein the rotary drive of the central gear comprises a rigid drive connection between the central gear and the central-gear drive motor.

8. A device according to claim 4, wherein the rotary drive of the central gear comprises a superimposed gear that has an output shaft driving the central gear and two input shafts, one of the input shafts being connected with the receiving-head drive motor for the rotary drive so as to be driven thereby and the other of the input shafts being connected with the central-gear drive motor so as to be driven thereby.

* * * * *